(12) United States Patent
Bellinger

(10) Patent No.: US 7,963,832 B2
(45) Date of Patent: Jun. 21, 2011

(54) ENGINE INTAKE AIR TEMPERATURE MANAGEMENT SYSTEM

(75) Inventor: Steven M. Bellinger, Columbus, IN (US)

(73) Assignee: Cummins Inc., Columbus, IN (US)

( * ) Notice: Subject to any disclaimer, the term of this patent is extended or adjusted under 35 U.S.C. 154(b) by 1452 days.

(21) Appl. No.: 11/359,789

(22) Filed: Feb. 22, 2006

(65) Prior Publication Data
US 2007/0197157 A1 Aug. 23, 2007

(51) Int. Cl.
*B60H 1/26* (2006.01)
(52) U.S. Cl. .................. 454/155; 123/552; 123/179.21
(58) Field of Classification Search ............ 454/69, 454/155; 237/12.3 A; 123/556, 552, 563, 123/179.21
See application file for complete search history.

(56) References Cited

U.S. PATENT DOCUMENTS

| | | | |
|---|---|---|---|
| 3,975,951 A * | 8/1976 | Kohama et al. ............ 73/114.34 |
| 4,835,963 A * | 6/1989 | Hardy .............................. 60/274 |
| 5,036,668 A * | 8/1991 | Hardy .............................. 60/599 |
| 5,046,473 A * | 9/1991 | Hokenson ..................... 123/556 |
| 5,172,753 A * | 12/1992 | Kadle et al. ...................... 165/42 |
| 5,549,872 A | 8/1996 | Hosoya et al. |
| 5,624,249 A | 4/1997 | Rohlfing |
| 5,716,586 A | 2/1998 | Taniguchi |
| 5,732,688 A | 3/1998 | Charlton et al. |
| 5,875,758 A | 3/1999 | Fujita |
| 6,314,949 B1 * | 11/2001 | DeGrazia et al. ............. 123/542 |
| 6,314,950 B1 * | 11/2001 | Burbank et al. .............. 123/542 |
| 6,327,980 B1 | 12/2001 | Chen et al. |
| 6,401,700 B2 | 6/2002 | Balekai et al. |
| 6,408,830 B1 | 6/2002 | McGrath |
| 6,461,207 B1 | 10/2002 | Nanmi |
| 6,598,387 B2 | 7/2003 | Carberry et al. |
| 6,742,331 B2 | 6/2004 | Minami |

(Continued)

FOREIGN PATENT DOCUMENTS

DE  4240239 A1  6/1994

(Continued)

OTHER PUBLICATIONS

PCT International Search Report and The Written Opinion of the International Searching Authority, or the Declaration dated Oct. 22, 2008 relating to the corresponding PCT Application No. PCT/US07/62475 (7 pages).

(Continued)

*Primary Examiner* — Steven B McAllister
*Assistant Examiner* — Brittany Towns
(74) *Attorney, Agent, or Firm* — Barnes & Thornburg LLP; J. Bruce Schelkopf

(57) ABSTRACT

A system for managing engine intake air temperature may comprise a first air flow control device having an inlet coupled to an outlet of a turbocharger compressor and a first outlet coupled to an inlet of a charge air cooler. A second outlet is coupled via a bypass conduit to the air intake manifold. The first air flow control device may selectively control air flow from the compressor outlet to the charge air cooler and/or bypass conduit. The system may alternatively or additionally include a second air flow control device having a first inlet receiving air external to the engine compartment, a second inlet receiving air from within the engine compartment and surrounding the engine and an outlet providing air flow to the engine. The second air flow control device may selectively control air flow from the first and/or second inlets thereof to the engine.

19 Claims, 3 Drawing Sheets

U.S. PATENT DOCUMENTS

| | | | |
|---|---|---|---|
| 6,742,731 B2 * | 6/2004 | Nemedi | 241/21 |
| 6,817,173 B2 | 11/2004 | Paffrath et al. | |
| 6,851,398 B2 | 2/2005 | Taylor, III et al. | |
| 6,866,030 B1 | 3/2005 | Sun et al. | |
| 6,892,842 B2 | 5/2005 | Bouffard et al. | |
| 6,907,862 B2 | 6/2005 | Kitahara | |
| 7,263,954 B2 | 9/2007 | Piddock et al. | |
| 7,267,086 B2 | 9/2007 | Allen et al. | |
| 2003/0029852 A1 | 2/2003 | Ozawa et al. | |
| 2003/0213235 A1 | 11/2003 | Kitahara et al. | |
| 2005/0022503 A1 | 2/2005 | Miura | |

FOREIGN PATENT DOCUMENTS

| | | |
|---|---|---|
| DE | 10259702 A1 | 7/2003 |
| FR | 2847005 A1 | 4/2004 |
| WO | 00/047886 A1 | 8/2000 |

OTHER PUBLICATIONS

European Search Report issued in connection with EP Application No. 09005714.2 by the European Patent Office on Apr. 13, 2011.

* cited by examiner

ENGINE INTAKE AIR TEMPERATURE MANAGEMENT SYSTEM

FIELD OF THE INVENTION

The present invention relates generally to exhaust gas aftertreatment components for internal combustion engines, and more specifically to structures and techniques for managing engine intake air temperatures to achieve exhaust gas temperatures suitable for operation of such aftertreatment components.

BACKGROUND

It is generally known to process exhaust gas produced by an internal combustion engine via one or more exhaust gas aftertreatment components for the purpose of reducing exhaust gas emissions. It is desirable to manage the temperature of air entering the engine, particularly under cooler ambient conditions, to achieve and/or maintain exhaust gas temperatures that are suitable for regenerating one or more such aftertreatment components.

SUMMARY

The present invention may comprise one or more of the features recited in the attached claims, and/or one or more of the following features and combinations thereof. A system for managing engine intake air temperature may comprise an internal combustion engine situated in an engine compartment of a vehicle, an air flow control device, a first air flow conduit and a second air flow conduit. The air flow control device has a first inlet, a second inlet and an outlet. The engine has an air intake manifold fluidly coupled to the outlet of the air flow control device. The first air flow conduit has one end fluidly coupled to the first air inlet of the air flow control device and an opposite end arranged to receive therein air from outside of the engine compartment. The second air flow conduit has one end fluidly coupled to the second air inlet of the air flow control device and an opposite end arranged inside of the engine compartment to receive therein air surrounding the engine. The air flow control device may be configured to selectively control air flow from either of the first and second air flow conduits to the outlet thereof.

The system may include a processor configured to produce a control signal. The air flow control device may be responsive to the control signal to selectively control air flow from the first and second air flow conduits to the outlet thereof.

The system may include a sensor producing a temperature signal indicative of an operating temperature associated with the engine. The processor may be configured to produce the control signal as a function of the temperature signal.

The processor may be configured to modify the control signal to cause the air flow control device to allow air flow only from the second air flow conduit to the outlet thereof when the temperature signal indicates that the operating temperature is below a first predefined temperature. Alternatively or additionally, the processor may be configured to modify the control signal to cause the air flow control device to allow air flow only from the first conduit to the outlet thereof when the temperature signal indicates that the operating temperature is above second predefined temperature that is higher than the first. Alternatively or additionally, the processor may be configured to modify the control signal to cause the air flow control device to selectively provide for air flow from both the first and second air flow conduits to the outlet thereof when the temperature signal indicates that the operating temperature is within a specified range of temperatures.

The temperature signal produced by the sensor may be indicative of a temperature of air entering the engine via the intake manifold. Alternatively or additionally, the engine may include an exhaust manifold fluidly coupled to an exhaust gas conduit, and the temperature signal produced by the sensor may be indicative of a temperature of exhaust gas flowing through the exhaust gas conduit. Alternatively or additionally, the temperature signal produced by the sensor may be indicative of ambient temperature outside of the engine compartment.

The sensor may be a physical sensor configured to produce the temperature signal in the form of an analog or digital signal. Alternatively or additionally, the processor may include the sensor in the form of at least one software algorithm executable by the processor to estimate the temperature signal as a function of one or more operating conditions different from the operating temperature.

The engine produces exhaust gas during operation thereof, and the exhaust gas exits the engine via an exhaust manifold fluidly coupled thereto. The system may further comprise an exhaust gas conduit fluidly coupled at one end to the exhaust manifold, an oxidation catalyst having an inlet fluidly coupled to an opposite end of the exhaust gas conduit and an outlet, and a particulate filter having an inlet fluidly coupled to the outlet of the oxidation catalyst and an outlet fluidly coupled to ambient. The system may further comprise a memory unit having stored therein a minimum temperature value that correlates to a minimum temperature of the exhaust gas at the inlet of the oxidation catalyst that is required to allow dosing the exhaust gas upstream of the oxidation catalyst with hydrocarbons. The oxidation catalyst may be configured to be responsive to the dosing of hydrocarbons into the exhaust gas upstream thereof to produce exhaust gas temperatures at the outlet thereof that are sufficient to regenerate the particulate filter. The processor may be configured to be responsive to the temperature signal to modify the control signal to cause the air flow control device to selectively provide for air flow from either of the first and second air flow conduits to the outlet thereof to maintain the operating temperature above the minimum temperature value. Alternatively, the memory unit may have stored therein a temperature value that correlates to a predefined intake manifold temperature. In this case, the processor may be configured to be responsive to the temperature signal to modify the control signal to cause the air flow control device to selectively provide for air flow from either of the first and second air flow conduits to the outlet thereof to maintain the operating temperature near the temperature value.

The system may include means for heating air passing through the second air flow conduit. The system may include a processor configured to produce a heating signal. The means for heating air passing through the second air flow conduit may be responsive to the heating signal to heat the air passing through the second air flow conduit. The system may include a sensor producing a temperature signal indicative of an operating temperature associated with the engine. The processor may be configured to produce the heating signal as a function of the temperature signal.

The system may include a turbocharger having a compressor defining an inlet fluidly coupled to the outlet of the air flow control device and an outlet fluidly coupled to the intake manifold.

A system for managing engine intake air temperature may comprise an internal combustion engine having an air intake manifold, a turbocharger having a compressor defining an inlet and an outlet, a charge air cooler having an inlet and an outlet fluidly coupled to the air intake manifold, an air flow control device having an inlet fluidly coupled to the outlet of the compressor, a first outlet fluidly coupled to the inlet of the charge air cooler and a second outlet, and a bypass conduit having one end fluidly coupled to the second outlet of the air flow control device and an opposite end fluidly coupled to the air intake manifold. The air flow control device may be configured to selectively control air flow from the compressor outlet into the charge air cooler and the bypass conduit.

The system may include a processor configured to produce a control signal. The air flow control device may be responsive to the control signal to selectively control air flow from the compressor outlet into the charge air cooler and the bypass conduit.

The system may include a sensor producing a temperature signal indicative of an operating temperature associated with the engine. The processor may be configured to produce the control signal as a function of the temperature signal.

The processor may be configured to modify the control signal to cause the air flow control device to allow air flow only from the compressor outlet into the bypass conduit when the temperature signal indicates that the operating temperature is below a first predefined temperature. Alternatively or additionally, the processor may be configured to modify the control signal to cause the air flow control device to allow air flow only from the compressor outlet into the charge air cooler when the temperature signal indicates that the operating temperature is above a second predefined temperature that is higher than the first. Alternatively or additionally, the processor may be configured to modify the control signal to cause the air flow control device to selectively provide for air flow from the compressor outlet into both of the charge air cooler and the bypass conduit when the temperature signal indicates that the operating temperature is within a specified range of temperatures.

The temperature signal produced by the sensor may be indicative of a temperature of air entering the engine via the air intake manifold. Alternatively or additionally, the engine may include an exhaust manifold fluidly coupled to an exhaust gas conduit, and the temperature signal produced by the sensor may be indicative of a temperature of exhaust gas flowing through the exhaust gas conduit. Alternatively or additionally, the temperature signal produced by the sensor may be indicative of ambient temperature outside of a vehicle carrying the engine.

The sensor may be a physical sensor configured to produce the temperature signal in the form of an analog or digital signal. Alternatively or additionally, the processor may include the sensor in the form of at least one software algorithm executable by the processor to estimate the temperature signal as a function of one or more operating conditions different from the operating temperature.

The engine produces exhaust gas during operation thereof, and the exhaust gas exits the engine via an exhaust manifold fluidly coupled thereto. The system may further comprise an exhaust gas conduit fluidly coupled at one end to the exhaust manifold, an oxidation catalyst having an inlet fluidly coupled to an opposite end of the exhaust gas conduit and an outlet, and a particulate filter having an inlet fluidly coupled to the outlet of the oxidation catalyst and an outlet fluidly coupled to ambient. The system may further comprise a memory unit having stored therein a minimum temperature value that correlates to a minimum temperature of the exhaust gas at the inlet of the oxidation catalyst that is required to allow dosing the exhaust gas upstream of the oxidation catalyst with hydrocarbons. The oxidation catalyst may be configured to be responsive to the dosing of hydrocarbons into the exhaust gas upstream thereof to produce exhaust gas temperatures at the outlet thereof that are sufficient to regenerate the particulate filter. The processor may be configured to be responsive to the temperature signal to modify the control signal to cause the air flow control device to selectively provide for air flow from the inlet thereof into either of the charge air cooler and the bypass conduit to maintain the operating temperature above the minimum temperature value. Alternatively, the memory unit may have stored therein a temperature value that correlates to predefined intake manifold temperature. In this case, the processor may be configured to be responsive to the temperature signal to modify the control signal to cause the air flow control device to selectively provide for air flow from the inlet thereof into either of the charge air cooler and the bypass conduit to maintain the operating temperature near the temperature value.

The system may include means for heating air passing through the bypass conduit. The system may include a processor configured to produce a heating signal. The means for heating air passing through the bypass conduit may be responsive to the heating signal to heat the air passing through the bypass conduit. The system may include a sensor producing a temperature signal indicative of an operating temperature associated with the engine. The processor may be configured to produce the heating signal as a function of the temperature signal.

Alternatively or additionally, the system may include an additional heater configured to heat air flowing through an air flow conduit fluidly coupling the outlet of the charge air cooler to the air intake manifold. The additional heater may be positioned downstream of the charge air cooler, downstream of a junction of the bypass conduit and the air flow conduit and upstream of the intake manifold. The processor may be configured to control operation of the additional heater. In this embodiment, the system may include a sensor producing a temperature signal indicative of an operating temperature associated with the engine. The processor may be configured to control operation of the heater as a function of the temperature signal.

A system for managing engine intake air temperature may comprise an internal combustion engine, a turbocharger, a charge air cooler, first and second flow control devices, first and second air flow conduits, and a bypass conduit. The engine may be situated in an engine compartment of a vehicle, and may have an air intake manifold fluidly. The turbocharger may have a compressor defining an inlet and an outlet. The charge air cooler may have an inlet and an outlet fluidly coupled to the air intake manifold. The first air flow control device may have an inlet fluidly coupled to the outlet of the compressor, a first outlet fluidly coupled to the inlet of the charge air cooler and a second outlet. The bypass conduit may have one end fluidly coupled to the second outlet of the first air flow control device and an opposite end fluidly coupled to the air intake manifold. The second air flow control device may have a first inlet, a second inlet and an outlet fluidly coupled to the inlet of the compressor. The first air flow conduit may have one end fluidly coupled to a first inlet of the second air flow control device and an opposite end arranged to receive therein air from outside of the engine compartment. The second air flow conduit may have one end fluidly coupled to a second inlet of the second air flow control device and an opposite end arranged inside of the engine compartment to receive therein air surrounding the engine. The first air flow control device may be configured to selectively control air flow from the compressor to the charge air cooler and the bypass conduit. The second air flow control device may be configured to selectively control air flow from the first and second air flow conduits into the inlet of the compressor.

DESCRIPTION OF THE ILLUSTRATIVE EMBODIMENT

For the purposes of promoting an understanding of the principles of the invention, reference will now be made to one illustrative embodiment shown in the attached drawings and specific language will be used to describe the same.

As used in the following description and in the appended claims, the term "fluidly coupled" is defined broadly to mean that a fluid path is established between two structures, and therefore includes direct as well as indirect fluid connections between recited structures. Thus, for example, "component A fluidly is coupled to component B" may be understood to be mean that component A may be fluidly connected directly to component B or that any number of additional components, conduits, devices, etc. may be interposed between component A and component B as long as a fluid path exists between components A and B.

Figure 1:
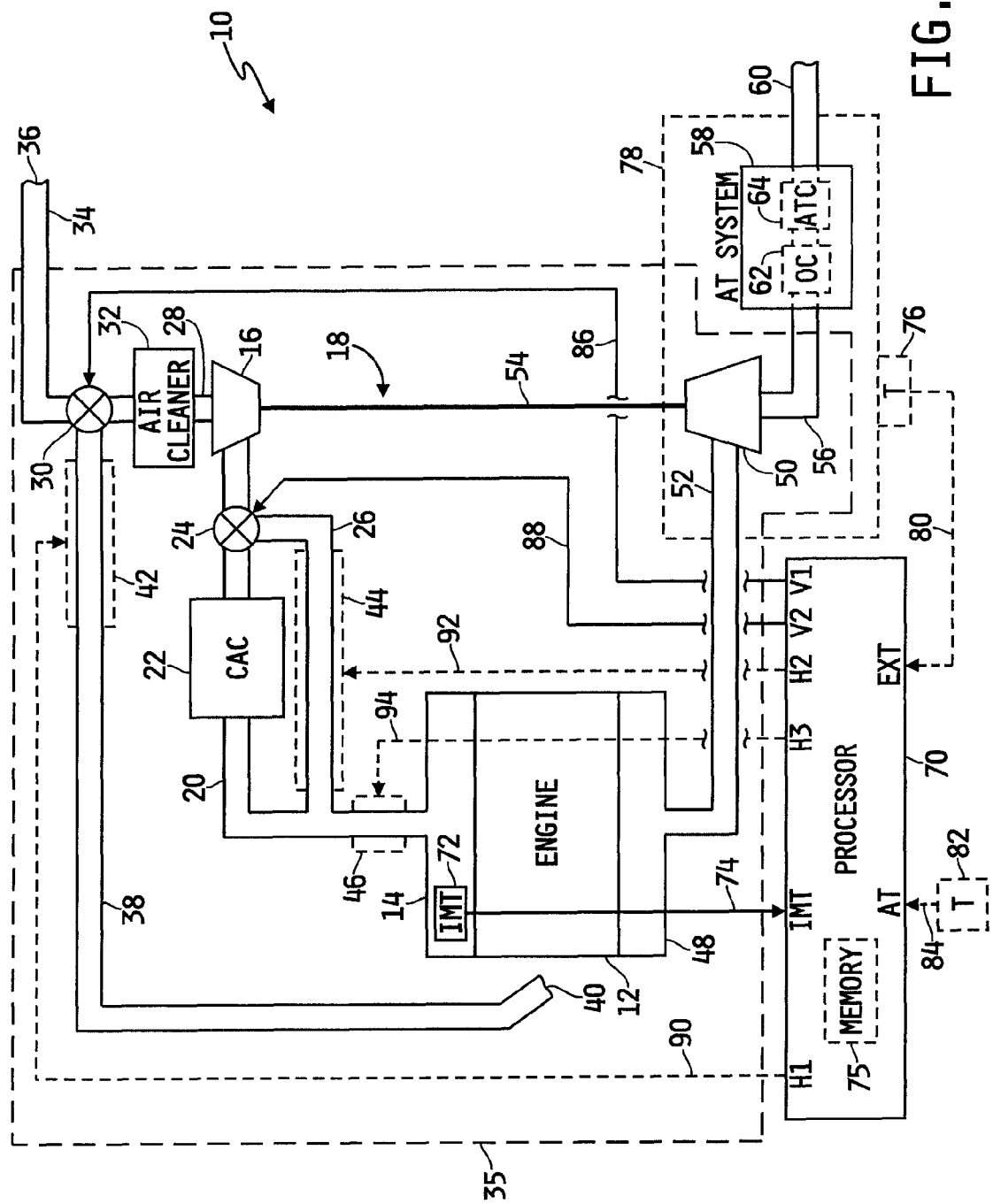
FIG. 1 is a block diagram of a system for managing engine intake air temperature.

Referring now to FIG. 1, a block diagram of a system 10 for managing engine intake air temperature is shown. In the illustrated embodiment, the system 10 includes an internal combustion engine 12 having an air intake manifold 14 fluidly coupled to an outlet of a compressor 16 of a conventional turbocharger 18 via an air flow conduit 20. A conventional charge air cooler (CAC) 22 is disposed in-line with the air flow conduit 20 between the outlet of the compressor 16 and the air intake manifold 14 of the engine 12. The charge air cooler 22 has an inlet fluidly coupled to the outlet of the compressor 16 and an outlet fluidly coupled to the air intake manifold 14. The charge air cooler 22 is configured in a conventional manner to cool air flowing from the outlet of the compressor 16 to the intake manifold 14 via the air flow conduit 20.

An air flow control device 24 is disposed in-line with the air flow conduit 20 between the outlet of the compressor 16 and the inlet of the charge air cooler 22. The air flow control device 24 has an inlet fluidly coupled to the outlet of the compressor 16, one outlet fluidly coupled to the inlet of the charge air cooler 22 and another outlet fluidly coupled to one end of a bypass conduit 26. The opposite end of the bypass conduit 26 is fluidly coupled to the air flow conduit 20 downstream of the outlet of the charge air cooler 22 and upstream of the air intake manifold. Alternatively, the outlet of the bypass conduit 26 may be fluidly coupled directly to the air intake conduit 14. Alternatively still, the air flow control device 24 may be disposed in-line with the air flow conduit 20 downstream of the charge air cooler 22, e.g., at the junction of the airflow conduit 20 and the bypass conduit 26 downstream of the charge air cooler 22.

The air flow control device 24 is generally configured to control air flow from the outlet of the compressor 16 through the charge air cooler 22 and the bypass conduit 26. In one illustrative embodiment, the air flow control device 24 may be or include one or more electronically controlled valves responsive to one or more control signals to selectively control air flow from the outlet of the compressor 16 through the charge air cooler 22 and the bypass conduit 26. In an alternative embodiment, the air flow control device may be or include one or more electronically controlled throttle plates, suitably positioned within the air flow conduit 20 and/or bypass conduit 26, and responsive to one or more control signals to selectively control air flow from the outlet of the compressor 16 through the charge air cooler 22 and the bypass conduit 26. Those skilled in the art will recognize other known electronically controllable air flow control devices and/or mechanisms, and the air flow control device 24 may be or include any such conventional air flow control devices and/or mechanisms. In any case, the air flow control device 24 will, in this embodiment, typically include one or more conventional actuators responsive to the one or more control signals to control the position of one or more valves, throttle plates and/or other known air flow control mechanisms.

In another illustrative embodiment, the air flow control device 24 may be or include one or more mechanically and/or pneumatically controlled valves, throttle plates and/or other known air flow control mechanisms. In this embodiment, the air flow control device 24 will typically include one or more mechanical linkages to one or more corresponding mechanical and/or pneumatic control mechanisms configured to control valve, throttle and/or other known air flow control mechanism position. The one or more mechanical and/or pneumatic control mechanisms may, for example, be or include one or more temperature responsive materials such that the position(s) of the one or more mechanical linkages is/are a function of an operating temperature associated with the engine 12.

In any of the embodiments of the air flow control device 24 described herein, the one or more valves, throttle plates and/or other known air flow control mechanisms may, for example, be configured to be continuously positionable or continually positionable relative to multiple discrete positions between open and closed positions to thereby provide for a high degree of control of air flow between the outlet of the compressor 16 and the charge air cooler 22 and between the outlet of the compressor 16 and the bypass conduit 26. Alternatively, the one or more valves, throttle plates and/or other known air flow control mechanisms may be controlled only between fully open and fully closed positions to thereby allow or inhibit air flow from the outlet of the compressor 16 to the charge air cooler 22 or bypass conduit 26. In either case, however, the air flow control device 24 will generally not be configured or controlled to simultaneously cut off air flow from the outlet of the compressor 16 to the charge air cooler 22 and the bypass conduit 24.

The compressor 16 has an inlet fluidly coupled to an outlet of another air flow control device 30 via an air flow conduit 28. A conventional air cleaner 32 may be disposed in-line with the conduit 28 between the outlet of the air flow control device 30 and the inlet of the compressor 16. The air flow control device 30, turbocharger 18, charge air cooler 22, air flow control device 24 and engine 12 are all situated, in a conventional manner, within an engine compartment 35 of a motor vehicle. The air flow control device 30 has one inlet fluidly coupled to one end of an air flow conduit 34 having an opposite end 36 arranged to receive therein air from outside of the engine compartment 35; i.e., air external to the vehicle carrying the engine 12. The air flow control device 30 has another inlet fluidly coupled to one end of another air flow conduit 38 having an opposite end 40 arranged inside of the engine compartment 35 to receive therein air surrounding the engine 12.

The air flow control device 30 is generally configured to control air flow from the air flow conduits 34 and 38 to the outlet thereof, e.g., to the inlet of the compressor 16 and, ultimately, to the intake manifold 14 of the engine 12. In one illustrative embodiment, the air flow control device 30 may be or include one or more electronically controlled valves responsive to one or more control signals to selectively control air flow from the air flow conduits 34 and 38 to the outlet thereof. In an alternative embodiment, the air flow control device may be or include one or more electronically controlled throttle plates, suitably positioned within the air flow conduit 28, 34 and/or 38, and responsive to one or more control signals to selectively control air flow from the air flow conduits 34 and 38 to the outlet thereof. Those skilled in the art will recognize other known electronically controllable air flow control devices and/or mechanisms, and the air flow control device 30 may be or include any such conventional air flow control devices and/or mechanisms. In any case, the air flow control device 30 will, in this embodiment, typically include one or more conventional actuators responsive to the one or more control signals to control the position of one or more valves, throttle plates and/or other known air flow control mechanisms.

In another illustrative embodiment, the air flow control device 30 may be or include one or more mechanically and/or pneumatically controlled valves, throttle plates and/or other known air flow control mechanisms. In this embodiment, the air flow control device 30 will typically include one or more mechanical linkages to one or more corresponding mechanical and/or pneumatic control mechanisms configured to control valve, throttle and/or other known air flow control mechanism position. The one or more mechanical and/or pneumatic control mechanisms may, for example, be or include one or more temperature responsive materials such that the position (s) of the one or more mechanical linkages is/are a function of an operating temperature associated with the engine 12.

In any of the embodiments of the air flow control device 30 described herein, the one or more valves, throttle plates and/or other known air flow control mechanisms may, for example, be configured to be continuously positionable or continually positionable relative to multiple discrete positions between open and closed positions to thereby provide for a high degree of control of air flow from the air flow conduits 34 and 38 to the outlet of the air flow control device 30. Alternatively, the one or more valves, throttle plates and/or other known air flow control mechanisms may be controlled only between fully open and fully closed positions to thereby allow or inhibit air flow from the air flow conduit 34 to the outlet of the air flow control device 30 or from the air flow conduit 38 to the outlet of the air flow control device 30. In either case, however, the air flow control device 30 will generally not be configured or controlled to simultaneously cut off air flow from both of the air flow conduits 34 and 38 to the outlet thereof.

The air flow conduit 38 may have an associated heater 42 configured to heat air flowing therethrough. Alternatively or additionally, the bypass conduit 26 may have an associated heater 44 for heating air flowing therethrough. In one embodiment, as illustrated in FIG. 1, the heaters 42 and 44 may be implemented in the form of electronically controlled heaters that are responsive to corresponding heating signals to generate heat in or about the corresponding conduits 38 and 26. Such heaters 42, 44 may, for example, take the form of conventional grid heaters positioned within the corresponding conduits 38 and 26. Alternatively, the heaters 42, 44 may take the form of plates, jackets or the like that extend at least partially about or within the corresponding conduits 38 and 26.

In an alternate embodiment, either heater 42, 44 may be provided in the form of a fluid circulating jacket or the like that extends at least partially about or within the corresponding conduit 38 and/or 26. In this embodiment, a heated fluid, such as engine coolant, is routed through the fluid circulating jacket to thereby transfer heat from the heater 42 and/or 44 to the air flowing through the air flow conduit 38 and/or bypass conduit 26. In this embodiment, the heaters 42 and/or 44 are not electronically controlled, but instead operate at continuously at substantially the same temperature as the fluid, e.g., engine coolant, engine oil, etc., circulating therethrough.

Alternatively or additionally, the air flow conduit 20 may have an associated heater 46 configured to heat air flowing therethrough at a location downstream of the junction of the bypass conduit 26 with the air flow conduit 20, and upstream of the air intake manifold. In one embodiment the heater 46 may be implemented in the form of electronically controlled heater that is responsive to a corresponding heating signal to generate heat in or about the air flow conduit 20. Such a heater 46 may, for example, take the form of a conventional grid heater positioned within the air flow conduit 20. Alternatively, the heater 46 may take the form of one or more plates, jackets or the like that extend at least partially around the air flow conduit 20.

The engine 12 has an exhaust manifold 48 that is fluidly coupled to an exhaust gas inlet of the turbocharger turbine 50 via an exhaust gas conduit 52. The turbine 50 is mechanically coupled to the compressor 16 via a rotatable shaft 54 in a conventional manner. Operation of the turbocharger 18 is conventional in that a turbine wheel (not shown) housed within the turbine 50 is responsive to the flow of exhaust gas through the exhaust gas conduit 52 to rotationally drive the shaft 54 and thereby rotate a compressor wheel (not shown) housed within the compressor 16. The rotational speed of the turbine wheel is proportional to the flow rate of exhaust gas through the turbine 50, and the mass flow rate of fresh air into the intake manifold 14 is, in turn, proportional to the rotational speed of the compressor wheel.

The turbine 50 has an exhaust gas outlet that is fluidly coupled to an inlet of an exhaust gas aftertreatment (AT) system 58 via another exhaust gas conduit 56. An outlet of the exhaust gas aftertreatment system 58 is fluidly coupled to ambient via yet another exhaust gas conduit 60. The exhaust gas aftertreatment system 58 includes a conventional oxidation catalyst (OC) 62 that is positioned upstream of one or more exhaust gas aftertreatment components (ATC) 64. The oxidation catalyst 62 is configured in a conventional manner to generate heat sufficient to regenerate the one or more exhaust gas aftertreatment components 64. The exhaust gas aftertreatment components may be or include, but should not be limited to, a particulate filter, a NOx adsorber or filter, a SOx adsorber or filter, and the like. One or more of the exhaust gas aftertreatment components 64 may be combined in a conventional manner to perform multiple exhaust gas aftertreatment functions.

In embodiments of the system 10 in which either air flow control device 24 and 30 is electronically controllable, and/or in embodiments of the system 10 that include any of the heaters 42, 44, 46 and at least one of these heaters is electronically controllable, the system 10 further includes a processor 70 having a memory unit 75. The processor 70 is, in one exemplary embodiment, microprocessor-based and operable execute a number of software algorithms that may be stored in the memory unit 75, for controlling various features of the system 10. In an alternative embodiment, the processor 70 may be or include any one or more electronic circuits and/or components operable as described hereinafter.

The processor 70 includes a number of inputs for receiving sensor-based and/or other information relating to the operation of the system 10. For example, in one exemplary embodiment the system 10 includes a temperature sensor 72 that is electrically connected to an intake manifold temperature input, IMT, of the processor 70 via a signal path 74. The temperature sensor 72 may be positioned in fluid communication with the air intake manifold 14, as illustrated by example in FIG. 1. Alternatively, the temperature sensor 72 may be positioned in fluid communication with the air flow conduit 20 downstream of the junction of the air flow conduit 20 and the bypass conduit 26, and also downstream of the heater 46 in embodiments of the system 10 that include the heater 46. In any case, the temperature sensor 72 is operable to produce a temperature signal on signal path 74 that is indicative of the temperature of air entering the air intake manifold 14, and the memory unit 75 includes one or more conventional software algorithms that are executable by the processor 70 to process this temperature signal and determine therefrom the temperature of air entering the air intake manifold 14. In an alternative embodiment, the memory unit 75 may include one or more conventional software algorithms that are executable by the processor 70 to estimate the temperature of air entering the air intake manifold 14 as a function of a number of other engine operating parameters.

The system 10 may further include a temperature sensor 76 that is electrically connected to an exhaust temperature input, EXT, of the processor 70 via a signal path 80. The temperature sensor 76 represents a generalized temperature sensor that may, in practice, be implemented as one or more temperature sensors that may be positioned in fluid communication with the exhaust gas conduit 52, the exhaust gas conduit 56 and/or the exhaust gas aftertreatment system 58. The temperature sensor 76 is thus illustrated in FIG. 1 as being arranged in fluid communication with a generalized exhaust system represented by the dashed-line box 78. The temperature sensor 76 is accordingly operable to produce a temperature signal on signal path 80 that is indicative of the temperature of exhaust gas flowing through the exhaust gas system 78, and the memory unit 75 includes one or more conventional software algorithms that are executable by the processor 70 to process this temperature signal and determine therefrom the temperature of exhaust gas flowing through the exhaust gas system 78. Alternatively or additionally, the memory unit 75 may include one or more conventional software algorithms that are executable by the processor 70 to estimate the temperature of the exhaust gas flowing through the exhaust gas conduit 52, a temperature associated with the operation of the turbine 50, the temperature of the exhaust gas flowing through the exhaust gas conduit 56 and/or the temperature of the exhaust gas flowing through any portion of the exhaust gas aftertreatment system 58, as a function of at least one other engine operating parameter.

The system 10 may further include a temperature sensor 82 that is electrically connected to an ambient temperature input, AT, of the processor 70 via a signal path 84. The temperature sensor 82 may be suitably positioned relative to the vehicle carrying the engine 12 to produce a temperature signal that is indicative of ambient temperature, i.e., the temperature of the environment around the vehicle. The memory unit 75 includes one or more conventional software algorithms that are executable by the processor 70 to process this temperature signal and determine therefrom the ambient temperature about the vehicle carrying the engine 12. Alternatively or additionally, the memory unit 75 may include one or more conventional software algorithms that are executable by the processor 70 to estimate the ambient temperature as a function of at least one other engine operating parameter. The memory unit 75 may additionally include one or more conventional software algorithms that are executable by the processor 70 to estimate the temperature of air exiting the outlet of the compressor 16, which may be used either alone or in connection with the ambient temperature to determine an operating temperature associated with the engine 12 as will be described by example hereinafter with reference to FIG. 3.

The processor 70 includes a number of outputs for controlling operation of the air flow control devices 24, 30 and operation of the heaters 42, 44 and 46 in embodiments of the system 10 that include electronically controllable implementations of such structures. For example, the processor 70 may have an air flow control device output, V1, that is electrically connected to an actuator associated with the air flow control device 30 via a signal path 86 in embodiments of the system 10 that include an electronically controllable implementation of the air flow control device 30. The processor 70 may have an air flow control device output, V2, that is electrically connected to an actuator associated with the air flow control device 24 via a signal path 88 in embodiments of the system 10 that include an electronically controllable implementation of the air flow control device 24. The processor 70 may have a heater output, H1 that is electrically connected to the heater 42 via a signal path 90 in embodiments of the system 10 that include an electronically controllable implementation of the heater 42. The processor 70 may have a heater output, H2 that is electrically connected to the heater 44 via a signal path 92 in embodiments of the system 10 that include an electronically controllable implementation of the heater 44. The processor 70 may have a heater output, H3 that is electrically connected to the heater 46 via a signal path 94 in embodiments of the system 10 that include an electronically controllable implementation of the heater 46.

It will be understood that the system 10 may include either one, but not both, of the air flow control devices 24, 30 and associated air flow conduits, or may alternatively include both of the air flow control devices 24, 30 and associated air flow conduits. In embodiments of the system 10 that include the air flow control device 30 and associated air flow conduit 38, the system 10 may or may not include the heater 42. Likewise, in embodiments of the system 10 that include the air flow control device 24 and associated bypass conduit 26, the system 10 may or may not include the heater 44. In embodiments of the system 10 that include either of the air flow control devices 24, 30, the system 10 may or may not include the heater 46. In any case, any one or combination of such structures is configured to provide for the management of engine intake air temperature.

Figure 2:
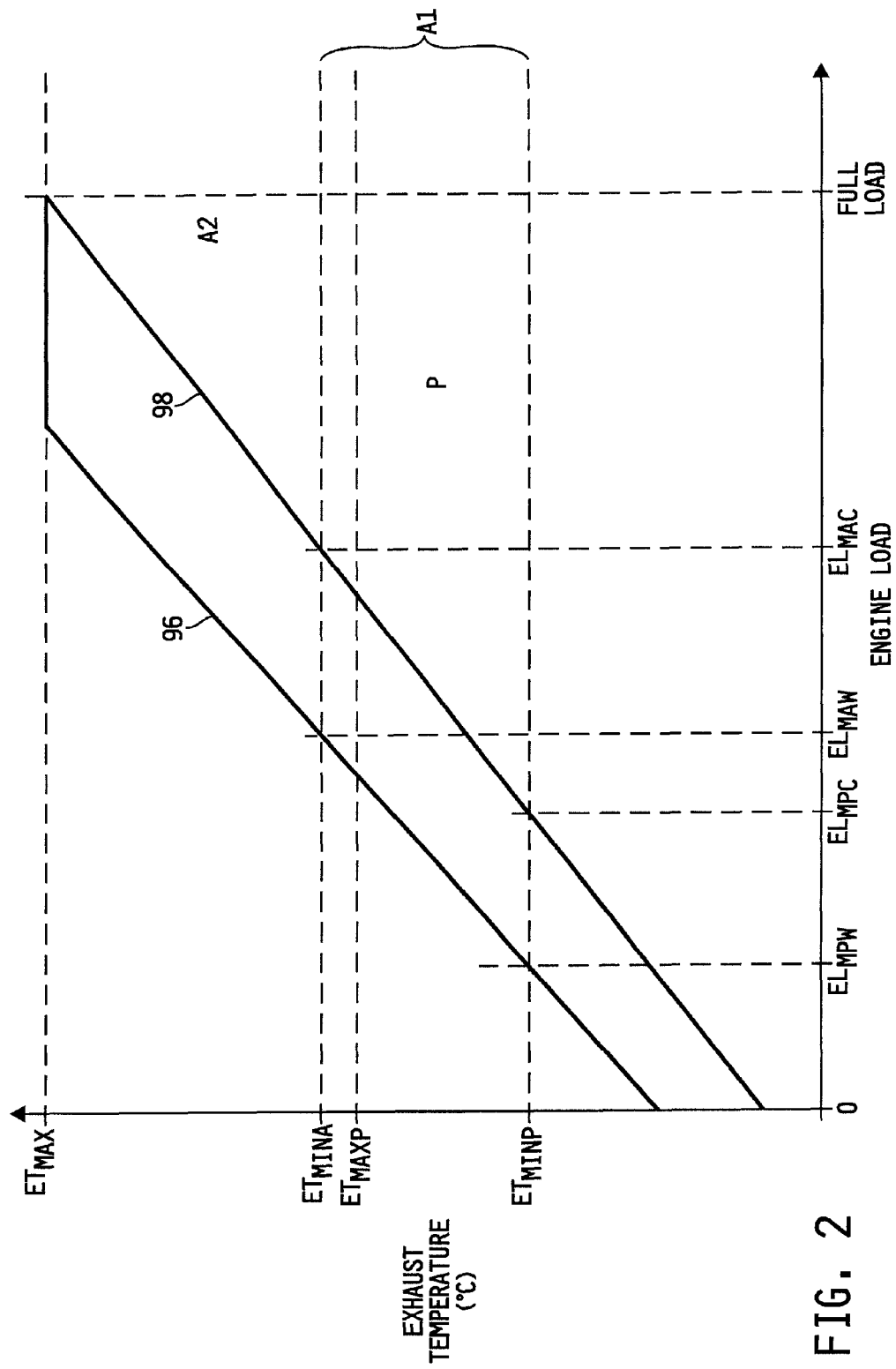
FIG. 2 is a plot of engine load vs. exhaust temperature for two example intake air temperature profiles illustrating example exhaust temperature thresholds, corresponding engine load thresholds, and regions defined thereby for passive and active regeneration of one or more exhaust gas aftertreatment components.

Referring now to FIG. 2, two curves 96 and 98 of engine load vs. exhaust gas temperature, for a conventional engine having a turbocharger and an exhaust gas aftertreatment system including an oxidation catalyst and a particulate filter downstream of the oxidation catalyst, are shown. The exhaust gas temperature in the curves 96 and 98 generally refer to the temperatures of exhaust gas at the inlet of the oxidation catalyst, which may or may not be the same as the temperatures of the exhaust gas exiting the exhaust gas manifold. The curve 96 corresponds to a constant, "warm" intake manifold temperature, e.g., 35° C., and the curve 98 corresponds to a constant "cold" intake manifold temperature, e.g., 0° C. The term "engine load," for purposes of this description, is an instantaneous value determined as a ratio of current engine fueling and a constant value of maximum engine fueling minus zero load engine fueling.

The curve 96 indicates that exhaust gas temperature generally increases as engine load increases as a result of the corresponding increased work being performed by the engine. Conventional steps are typically taken to limit the exhaust gas temperature to a maximum exhaust gas temperature $ET_{MAX}$. In this example, the curve 96 indicates that the exhaust gas temperature reaches $ET_{MAX}$ before engine load reaches FULL LOAD (i.e., maximum or 100% engine load), and the exhaust gas temperature is thus limited to $ET_{MAX}$ in the high engine load range. Above a minimum exhaust gas temperature, $ET_{MINP}$, and below a maximum exhaust gas temperature, $ET_{MAXP}$, it is known that the oxidation catalyst will, in the presence of a suitable amount of NOx carried by the exhaust gas stream, generate temperatures suitable for regenerating (cleaning) the downstream particulate filter 64 as a result of a known chemical reaction of the NOx with the oxidation catalyst 62. This regeneration process will be referred to hereinafter as "passive regeneration" of a particulate filter, $ET_{MINP}$ will be referred to as the minimum exhaust gas temperature required for passive regeneration, and $ET_{MAXP}$ will be referred to as the maximum exhaust gas temperature under which passive regeneration occurs. As illustrated in FIG. 2, the intersection of the curve 96 with $ET_{MINP}$ defines a minimum engine load value, $EL_{MPW}$, below which exhaust gas temperatures between $ET_{MINP}$ and $ET_{MAXP}$ are not achieved at the "warm" intake manifold temperature represented by the curve 96. In FIG. 2, the region between $ET_{MINP}$ and $ET_{MAXP}$ and bounded at low engine loads by the curve 96 is thus indicated with a "P" to thereby identify the range of engine exhaust temperatures and engine loads at which passive regeneration may occur at the "warm" intake manifold temperature represented by the curve 96.

In the temperature range between $ET_{MINP}$ and $ET_{MINA}$, it is also known that the oxidation catalyst will generate temperatures suitable for regenerating the downstream particulate filter without NOx (or with only very small amounts of NOx) in the exhaust gas stream. However, without NOx (or with only very small amounts of NOx) in the exhaust gas stream, it is generally necessary in this exhaust gas temperature and engine load region to add some amount of unburned hydrocarbons to the exhaust gas upstream of the oxidation catalyst. As long as the exhaust gas temperature is between $ET_{MINP}$ and $ET_{MINA}$ and engine load is greater than the intersection of the curve 96 with $EL_{MPW}$, the oxidation catalyst will react with in a known manner with the unburned hydrocarbons to produce temperatures suitable for regenerating the downstream particulate filter. This regeneration process will be referred to hereinafter as a "first active regeneration" of a particulate filter, $ET_{MINP}$ will be referred to as the minimum exhaust gas temperature required for the first active regeneration, and $ET_{MINA}$ will be referred to as the maximum exhaust gas temperature under which the first active regeneration occurs. In FIG. 2, the region above $ET_{MINP}$ and below $ET_{MINA}$, and bounded at low engine loads by the curve 96 is thus indicated with an "A1" to thereby identify the range of engine exhaust temperatures and engine load values in which the first active regeneration may occur at the "warm" intake manifold temperature represented by the curve 96. In any case, unburned hydrocarbons for the first active regeneration are typically added to the exhaust gas stream in the form of post-injection fueling.

Above $ET_{MINA}$ and for engine load values greater than the intersection of the curve 96 with $ET_{MINA}$, it is known that the temperature of the exhaust gas produced by the engine will generally be high enough to regenerate the downstream particulate filter 64 without NOx (or with only very small amounts of NOx) and without having to dose the exhaust gas stream with unburned hydrocarbons. This regeneration process will be referred to hereinafter as a "second active regeneration" of a particulate filter, and $ET_{MA}$ will be referred to as the minimum exhaust gas temperature required for the second active regeneration. As illustrated in FIG. 2, the intersection of the curve 96 with $ET_{MINA}$ defines a minimum engine load value, $EL_{MAW}$, below which exhaust gas temperatures above $ET_{MINA}$ are not achieved at the "warm" intake manifold temperature represented by the curve 96. In FIG. 2, the region above $ET_{MINA}$ and bounded at low engine loads by the curve 96 is thus indicated with a "A2" to thereby identify the range of engine exhaust temperatures and engine load values in which the second active regeneration may occur at the "warm" intake manifold temperature represented by the curve 96.

At exhaust gas temperatures below $ET_{MINP}$, it is known that the oxidation catalyst generally cannot generate temperatures high enough to sustain regeneration of the downstream particulate filter, even in the presence of NOx or unburned hydrocarbons. Accordingly, steps are typically taken to avoid regeneration when the exhaust gas temperature is below $ET_{MINP}$, and/or to elevate the exhaust gas temperature above $ET_{MINP}$.

In FIG. 2, another curve 98 of engine load vs. exhaust gas temperature, for the same conventional engine having a turbocharger and an exhaust gas aftertreatment system including an oxidation catalyst and a particulate filter downstream of the oxidation catalyst, is also shown. The exhaust gas temperature in the curve 98, like the exhaust gas temperature in the curve 96, generally refers to the temperature of exhaust gas at the inlet of the oxidation catalyst, which may or may not be the same as the temperature of the exhaust gas exiting the exhaust gas manifold. The curve 98 corresponds to a constant, "cold" intake manifold temperature, e.g., 0° C. In this example, the curve 98 indicates that the exhaust gas temperature reaches $ET_{MAX}$ as the engine load reaches FULL LOAD. As illustrated in FIG. 2, the engine load ranges in which passive and active regeneration may occur at the "cold" intake manifold temperature represented by the plot 98 are both less than the engine load ranges in which passive and active regeneration may occur at the "warm" intake manifold temperature represented by the plot 96.

From the information provided in FIG. 2, it can be concluded that as ambient (outside) temperatures decrease, the minimum engine load values at which passive and active regeneration may occur both increase. By implementing one or more of the structures and techniques shown and described hereinabove in relation to the system 10 of FIG. 1, the temperature of air entering the air intake manifold 14 may be managed to extend the range of engine loads, e.g., to lower engine loads, in which passive and active regeneration may occur. This will allow for passive and/or active regeneration under low engine load conditions at cold ambient temperatures where it may not otherwise be possible to initiate and/or sustain passive and/or active regeneration. Extending the engine load range under which passive regeneration may occur may further lessen the frequency of active regeneration events, thereby resulting in potential fuel savings. A suitable close-loop, open-loop control system, or combination thereof, for achieving either or both of these goals may be implemented in embodiments of the system 10 that include electronically controllable implementations of either of the air flow control devices 24, 30 and/or any of the heaters 42, 44, 46.

Figure 3:
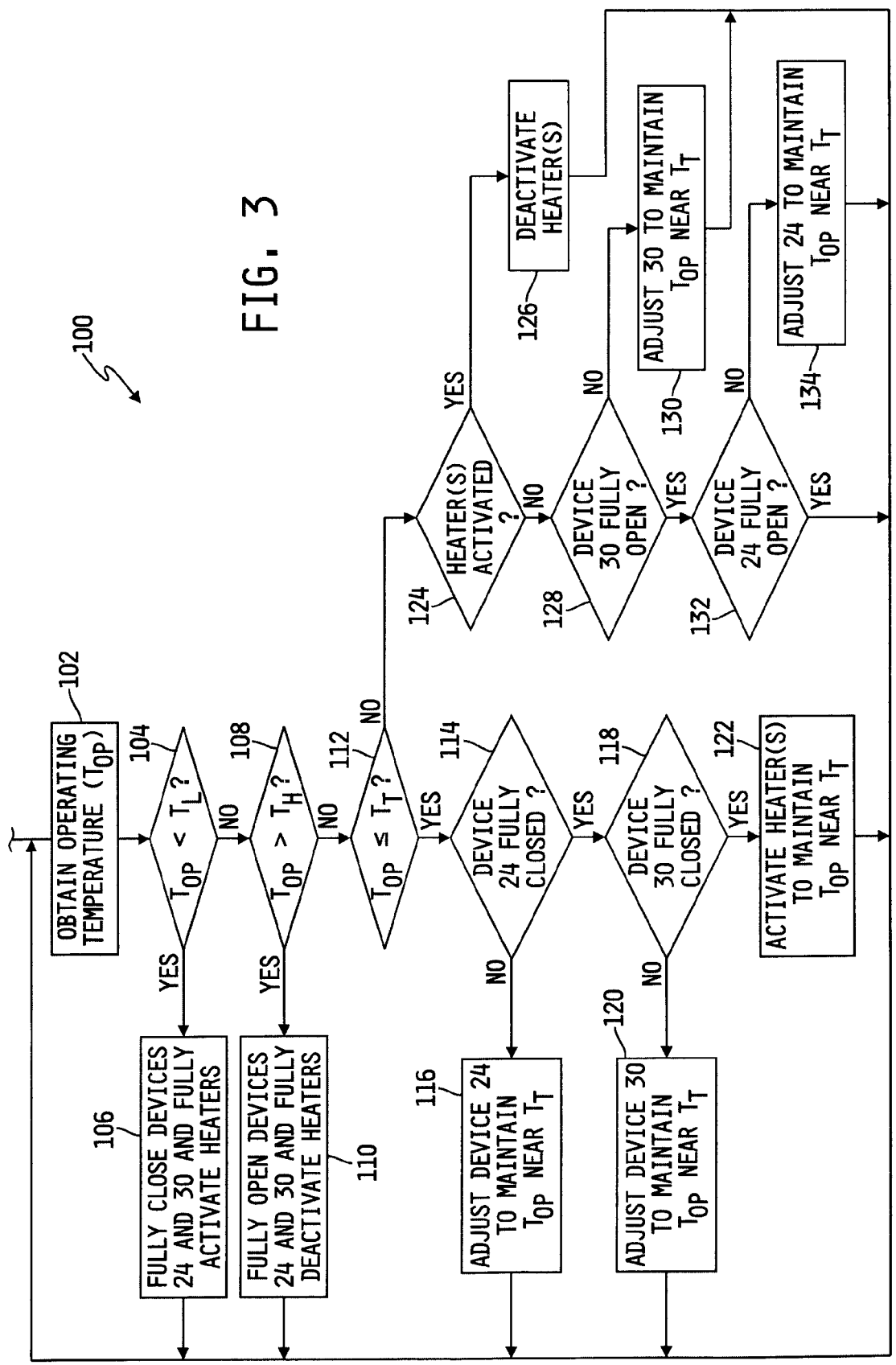
FIG. 3 is a flowchart of one illustrative software algorithm for managing engine intake air temperature using the system illustrated in FIG. 1.

Referring now to FIG. 3, a flowchart of a process 100 is shown for achieving either, or both, of the goals provided by way of example above. The process 100 may be implemented in the form of one or more software algorithms that may be stored in the memory unit 75 and executed by the processor 70. The process 100 represents a closed-loop control strategy for an implementation of the system 10 of FIG. 1 that includes electronically controllable implementations of both of the air flow control devices 24, 30 and all of the heaters 42, 44, 46. With respect to the air flow control device 24, the terms "fully close" and "fully closed" are defined as the position or state of the air flow control device 24 that inhibits air flow through the charge air cooler and directs all of the air exiting the outlet of the compressor 16 through the bypass conduit 26, and the term "fully open" is defined as the position or state of the air flow control device 24 that inhibits air flow through the bypass conduit 26 and directs all of the air exiting the outlet of the compressor 16 through the charge air cooler 22. With respect to the air flow control device 30, the terms "fully close" and "fully closed" are defined as the position or state of the air flow control device 30 that inhibits air flow therethrough from the air flow conduit 34 and allows air flow therethrough only from the air flow conduit 38, and the term "fully open" is defined as the position or state of the air flow control device 30 that inhibits air flow therethrough from the air flow conduit 38 and allows air flow therethrough only from the air flow conduit 34. The process 100 is provided only by way of example, and should not be considered to be limiting in any way.

The example process 100 is closed-loop control strategy for controlling both of the air flow control devices 24, 30 and all of the heaters 42, 44, 46 as a function of a generalized operating temperature, $T_{OP}$. The operating temperature, $T_{OP}$, is a temperature associated with operation of the engine 12, and may be or include any of the temperature signals and/or values described hereinabove with respect to FIG. 1. For example, $T_{OP}$ in one illustrative embodiment may be the air intake manifold temperature. Alternatively, $T_{OP}$ may be or include any one or more of the exhaust gas temperature signals and/or values described with respect to FIG. 1. Alternatively still, $T_{OP}$ may be the ambient (outside) temperature. In some embodiments, a closed-loop or open-loop control strategy, or combination thereof, may be implemented to control either one, or both of, the air flow control devices 24, 30 and/or any one or more of the heaters 42, 44, 46 as a function not only of $T_{OP}$, but also as a function of one or more additional engine operating conditions. Examples of such one or more additional engine operating conditions may include, but are not limited to, engine load, engine speed, boost pressure, turbocharger speed, or the like.

In any case, the process 100 begins at step 102 where the processor 70 obtains the operating temperature, $T_{OP}$. Thereafter at step 104, the processor 70 is operable to determine whether $T_{OP}$ is less than a predefined low temperature value, $T_L$. If so, execution of the process 100 advances to step 106 where the processor 70 produces appropriate control signals to fully close the air flow control devices 24, 30, and appropriate heating signals to fully activate the heaters 42, 44 and 46. From step 106, the process 100 loops back to step 102. The predefined low temperature, $T_L$, will typically be chosen as an operating temperature, $T_{OP}$, that is low enough to justify full closure of the air flow control devices 24, 30 and full activation of all of the heaters 42, 44, 46.

If, at step 104, the processor 70 determines that $T_{OP}$ is not less than $T_L$, execution of the process 100 advances to step 108 where the processor 70 is operable to determine whether $T_{OP}$ is greater than a predefined high temperature value, $T_H$. If so, execution of the process 100 advances to step 110 where the processor 70 produces appropriate control signals to fully open the air flow control devices 24, 30, and appropriate heating signals to deactivate the heaters 42, 44 and 46. From step 110, the process 100 loops back to step 102. The predefined high temperature, $T_H$, will typically be chosen as an operating temperature, $T_{OP}$, that is high enough to justify full opening of the air flow control devices 24, 30 and deactivation of all of the heaters 42, 44, 46.

If, at step 108, the processor 70 determines that $T_{OP}$ is not greater than $T_H$, execution of the process 100 advances to step 112 where the processor 70 is operable to determine whether $T_{OP}$ is less than or equal to a predefined target temperature value, $T_T$. The target temperature, $T_T$, may ultimately correspond or correlate to a desired or target exhaust gas temperature. In one embodiment, for example, the memory unit 75 may have stored therein $T_T$ in the form of a minimum temperature value that correlates to a minimum temperature of the exhaust gas at the inlet of the oxidation catalyst that is required to allow dosing the exhaust gas upstream of the oxidation catalyst with hydrocarbons. Alternatively, the memory unit 75 may have stored therein $T_T$ in the form of a temperature value that correlates to a particular intake manifold temperature, e.g., a "warm" intake manifold temperature. According to the information in FIG. 2, this will allow exhaust gas temperatures suitable for passive and/or active regeneration to be achieved over a wider range of engine loads than at colder intake manifold temperatures. As a result, active and/or passive regeneration may occur at lower engine loads than at colder intake manifold temperatures. It will be understood that other values of $T_T$ may be used, and that any such other values of $T_T$ are contemplated by this disclosure.

In any case, if the processor 70 determines at step 112 that $T_{OP}$ is less than or equal to $T_T$, execution of the process 100 advances to step 114 where the processor 70 is operable to determine whether the air flow control device 24 is fully closed. If not, the air flow control device 24 still has some adjustability and execution of the processor 70 therefore advances to step 116 where the processor 70 is operable to produce appropriate control signals to adjust the air flow control device 24 in a manner that will result in maintaining $T_{OP}$ near $T_T$. Thereafter, the process 100 loops back to step 102.

If, at step 114, the processor 70 determines that the air flow control device 24 is fully closed, execution of the process 100 advances to step 118 where the processor 70 is operable to determine whether the air flow control device 30 is fully closed. If not, the air flow control device 30 still has some adjustability and execution of the processor 70 therefore advances to step 120 where the processor 70 is operable to produce appropriate control signals to adjust the air flow control device 30 in a manner that will result in maintaining $T_{OP}$ near $T_T$. Thereafter, the process 100 loops back to step 102.

If, at step 118, the processor 70 determines that the air flow control device 30 is fully closed, execution of the process 100 advances to step 122 where the processor 70 is operable to produce appropriate heating signals to activate one or more of the heaters 42, 44, 46 in a manner that will result in maintaining $T_{OP}$ near $T_T$. Thereafter, the process 100 loops back to step 102.

If, at step 112, the processor 70 determines that $T_{OP}$ is not less than or equal to $T_T$, execution of the process 100 advances to step 124 where the processor 70 is operable to determine whether any of the heaters 42, 44, 46 are currently activated. If so, execution of the process 100 advances to step 126 where the processor is operable to produce appropriate heating signals to deactivate one or more of the heaters 42, 44, 46. Thereafter, the process 100 loops back to step 102.

If, at step 124, the processor 70 determines that none of the heaters 42, 44, 46 are activated, execution of the process 100 advances to step 128 where the processor 70 is operable to determine whether the air flow control device 30 is fully open. If not, the process 100 advances to step 130 where the processor 70 is operable to produce appropriate control signals to adjust the air flow control device 30 in a manner that will result in maintaining $T_{OP}$ near $T_T$. Thereafter, the process 100 loops back to step 102.

If, at step 128, the processor 70 determines that the air flow control device 30 is fully open, execution of the process 100 advances to step 128 where the processor 70 is operable to determine whether the air flow control device 24 is fully open. If not, the process 100 advances to step 134 where the processor 70 is operable to produce appropriate control signals to adjust the air flow control device 24 in a manner that will result in maintaining $T_{OP}$ near $T_T$. Thereafter, and also from the "YES" branch of step 132, the process 100 loops back to step 102.

It will be understood that some embodiments of the system 10 may further include a conventional exhaust gas recirculation (EGR) structure fluidly coupled between the exhaust manifold 48 and the air intake manifold 14 (not shown), and that such a structure will, when in use, typically affect the temperature of the air flowing into the air intake manifold 14. Any additional steps required in the process 100 to account for such a temperature affect would be a mechanical step for a skilled artisan.

While the invention has been illustrated and described in detail in the foregoing drawings and description, the same is to be considered as illustrative and not restrictive in character, it being understood that only one illustrative embodiment thereof has been shown and described and that all changes and modifications that come within the spirit of the invention are desired to be protected.

What is claimed is:

1. A system for managing engine intake air temperature, comprising:
   an internal combustion engine situated in an engine compartment of a vehicle and having an air intake manifold,
   a turbocharger having a compressor defining an inlet and an outlet,
   a charge air cooler having an inlet and an outlet fluidly coupled to the air intake manifold,
   a first air flow control device having an inlet fluidly coupled to the outlet of the compressor, a first outlet fluidly coupled to the inlet of the charge air cooler and a second outlet, the first air flow control device responsive to a first control signal to selectively control a position the first air flow control device, the first air flow control device controllable between a fully open position in which the first air flow control device directs air from the outlet of the compressor only through first outlet of the first air flow control device and a fully closed position in which the first air flow control device directs air from the outlet of the compressor only through the second outlet of the first air flow control device, the first air flow control device selectively directing air from the outlet of the compressor through both of the first and second outlets of the first air flow control device in positions between the fully open and fully closed position thereof,
   a bypass conduit having one end fluidly coupled to the second outlet of the first air flow control device and an opposite end fluidly coupled to the air intake manifold,
   a second air flow control device having a first inlet, a second inlet and an outlet fluidly coupled to the inlet of the compressor, the second air flow control device responsive to a second control signal to selectively control a position the second air flow control device, the second air flow control device controllable between a fully open position in which the second air flow control device directs air from only the first inlet of the second air flow control device through the outlet of the second air flow control device and a fully closed position in which the second air flow control device directs air from only the second inlet of the second air flow control device through the outlet of the second air flow control device, the second air flow control device selectively directing air from both of the first and second inlets of the second air flow control device through the outlet of the second air flow control device in positions between the fully open and fully closed positions thereof,
   a first air flow conduit having one end fluidly coupled to the first inlet of the second air flow control device and an opposite end arranged to receive therein air from outside of the engine compartment,
   a second air flow conduit having one end fluidly coupled to the second inlet of the second air flow control device and an opposite end arranged inside of the engine compartment to receive therein air surrounding the engine,
   a sensor producing a temperature signal indicative of an operating temperature associated with the engine, and
   a processor including a memory having one or more software algorithms stored therein executable by the processor to selectively produce only the first control signal to adjust the position of the first air flow control device to maintain the operating temperature associated with the engine near a target operating temperature if the temperature signal indicates that a current operating temperature associated with the engine is less than the target operating temperature and the first air flow control device is not in the fully closed position thereof, and to selectively produce only the second control signal to adjust the position of the second air flow control device to maintain the operating temperature associated with the engine near the target operating temperature if the temperature signal indicates that the current operating temperature associated with the engine is less than the target operating temperature and the first air flow control device is in the fully closed position thereof.

2. The system of claim 1 wherein the one or more software algorithms stored in the memory include one or more software algorithms executable by the processor to selectively produce the first and second control signals to control the positions of the first and second air flow control devices to their fully closed positions if the temperature signal indicates that the current operating temperature associated with the engine is less than a low threshold temperature that is less than the target operating temperature.

3. The system of claim 2 further comprising:
   means responsive to a first heating signal for heating air passing through the bypass conduit, and
   means responsive to a second heating signal for heating air passing through the second air flow conduit,
   wherein the one or more software algorithms stored in the memory include one or more software algorithms executable by the processor to selectively produce the first and second heating signals if the temperature signal indicates that the current operating temperature associated with the engine is less than the low threshold temperature.

4. The system of claim 1 wherein the one or more software algorithms stored in the memory include one or more software algorithms executable by the processor to selectively produce the first and second control signals to control the positions of the first and second air flow control devices to their fully open positions if the temperature signal indicates that the current operating temperature associated with the engine is greater than a high threshold temperature that is greater than the target operating temperature.

5. The system of claim 1 further comprising:
   means responsive to a first heating signal for heating air passing through the bypass conduit, and
   means responsive to a second heating signal for heating air passing through the second air flow conduit,
   wherein the one or more software algorithms stored in the memory include one or more software algorithms executable by the processor to selectively produce at least one of the first and second heating signals to maintain the operating temperature associated with the engine near the target operating temperature if the temperature signal indicates that the current operating temperature associated with the engine is less than the target operating temperature and the second air flow control device is in the fully closed position thereof.

6. The system of claim 1 wherein the temperature signal produced by the sensor is indicative of a temperature of air entering the engine via the intake manifold.

7. The system of claim 1 wherein the engine further includes an exhaust manifold fluidly coupled to an exhaust gas conduit,
   and wherein the temperature signal produced by the sensor is indicative of a temperature of exhaust gas flowing through the exhaust gas conduit.

8. The system of claim 1 wherein the temperature signal produced by the sensor is indicative of ambient temperature outside of the engine compartment.

9. The system of claim 1 wherein the processor includes the sensor in the form of at least one software algorithm executable by the processor to estimate the temperature signal as a function of one or more operating conditions different from the operating temperature.

10. The system of claim 1 wherein the engine produces exhaust gas during operation thereof, and the exhaust gas exits the engine via an exhaust manifold fluidly coupled thereto, and wherein the system further comprises:
    an exhaust gas conduit fluidly coupled at one end to the exhaust manifold,
    an oxidation catalyst having an inlet fluidly coupled to an opposite end of the exhaust gas conduit and an outlet, and
    a particulate filter having an inlet fluidly coupled to the outlet of the oxidation catalyst and an outlet fluidly coupled to ambient,
    and wherein the memory has stored therein the target temperature in the form of a temperature value that correlates to a temperature of the exhaust gas at the inlet of the oxidation catalyst that is required to allow dosing the exhaust gas upstream of the oxidation catalyst with hydrocarbons, the oxidation catalyst being configured to be responsive to the dosing of hydrocarbons into the exhaust gas upstream thereof to produce exhaust gas temperatures at the outlet thereof that are sufficient to regenerate the particulate filter.

11. A system for managing engine intake air temperature, comprising:
    an internal combustion engine situated in an engine compartment of a vehicle and having an air intake manifold,
    a turbocharger having a compressor defining an inlet and an outlet,
    a charge air cooler having an inlet and an outlet fluidly coupled to the air intake manifold,
    a first air flow control device having an inlet fluidly coupled to the outlet of the compressor, a first outlet fluidly coupled to the inlet of the charge air cooler and a second outlet, the first air flow control device responsive to a first control signal to selectively control a position the first air flow control device, the first air flow control device controllable between a fully open position in which the first air flow control device directs air from the outlet of the compressor only through first outlet of the first air flow control device and a fully closed position in which the first air flow control device directs air from the outlet of the compressor only through the second outlet of the first air flow control device, the first air flow control device selectively directing air from the outlet of the compressor through both of the first and second outlets of the first air flow control device in positions between the fully open and fully closed position thereof,
    a bypass conduit having one end fluidly coupled to the second outlet of the first air flow control device and an opposite end fluidly coupled to the air intake manifold,
    a second air flow control device having a first inlet, a second inlet and an outlet fluidly coupled to the inlet of the compressor, the second air flow control device responsive to a second control signal to selectively control a position the second air flow control device, the second air flow control device controllable between a fully open position in which the second air flow control device directs air from only the first inlet of the second air flow control device through the outlet of the second air flow control device and a fully closed position in which the second air flow control device directs air from only the second inlet of the second air flow control device through the outlet of the second air flow control device, the second air flow control device selectively directing air from both of the first and second inlets of the second air flow control device through the outlet of the second air flow control device in positions between the fully open and fully closed positions thereof,
    a first air flow conduit having one end fluidly coupled to the first inlet of the second air flow control device and an opposite end arranged to receive therein air from outside of the engine compartment,
    a second air flow conduit having one end fluidly coupled to the second inlet of the second air flow control device and an opposite end arranged inside of the engine compartment to receive therein air surrounding the engine,
    a sensor producing a temperature signal indicative of an operating temperature associated with the engine, and
    a processor including a memory having one or more software algorithms stored therein executable by the processor to selectively produce only the second control signal to adjust the position of the second air flow control device to maintain the operating temperature associated with the engine near a target operating temperature if the temperature signal indicates that a current operating temperature associated with the engine is greater than the target operating temperature and the first air flow control device is not in the fully open position thereof, and to selectively produce only the first control signal to adjust the position of the first air flow control device to maintain the operating temperature associated with the engine near the target operating temperature if the temperature signal indicates that the current operating temperature associated with the engine is greater than the target operating temperature and the second air flow control device is in the fully open position thereof.

12. The system of claim 11 wherein the one or more software algorithms stored in the memory include one or more software algorithms executable by the processor to selectively produce the first and second control signals to control the positions of the first and second air flow control devices to their fully closed positions if the temperature signal indicates that the current operating temperature associated with the engine is less than a low threshold temperature that is less than the target operating temperature.

13. The system of claim 12 further comprising:
   means responsive to a first heating signal for heating air passing through the bypass conduit, and
   means responsive to a second heating signal for heating air passing through the second air flow conduit,
   wherein the one or more software algorithms stored in the memory include one or more software algorithms executable by the processor to selectively produce the first and second heating signals if the temperature signal indicates that the current operating temperature associated with the engine is less than the low threshold temperature.

14. The system of claim 11 wherein the one or more software algorithms stored in the memory include one or more software algorithms executable by the processor to selectively produce the first and second control signals to control the positions of the first and second air flow control devices to their fully open positions if the temperature signal indicates that the current operating temperature associated with the engine is greater than a high threshold temperature that is greater than the target operating temperature.

15. The system of claim 11 wherein the temperature signal produced by the sensor is indicative of a temperature of air entering the engine via the intake manifold.

16. The system of claim 11 wherein the engine further includes an exhaust manifold fluidly coupled to an exhaust gas conduit,
   and wherein the temperature signal produced by the sensor is indicative of a temperature of exhaust gas flowing through the exhaust gas conduit.

17. The system of claim 11 wherein the temperature signal produced by the sensor is indicative of ambient temperature outside of the engine compartment.

18. The system of claim 11 wherein the processor includes the sensor in the form of at least one software algorithm executable by the processor to estimate the temperature signal as a function of one or more operating conditions different from the operating temperature.

19. The system of claim 11 wherein the engine produces exhaust gas during operation thereof, and the exhaust gas exits the engine via an exhaust manifold fluidly coupled thereto, and wherein the system further comprises:
   an exhaust gas conduit fluidly coupled at one end to the exhaust manifold,
   an oxidation catalyst having an inlet fluidly coupled to an opposite end of the exhaust gas conduit and an outlet, and
   a particulate filter having an inlet fluidly coupled to the outlet of the oxidation catalyst and an outlet fluidly coupled to ambient,
   and wherein the memory has stored therein the target temperature in the form of a temperature value that correlates to a temperature of the exhaust gas at the inlet of the oxidation catalyst that is required to allow dosing the exhaust gas upstream of the oxidation catalyst with hydrocarbons, the oxidation catalyst being configured to be responsive to the dosing of hydrocarbons into the exhaust gas upstream thereof to produce exhaust gas temperatures at the outlet thereof that are sufficient to regenerate the particulate filter.

* * * * *